US005318072A

United States Patent [19]

Goedecke

[11] Patent Number: 5,318,072

[45] Date of Patent: Jun. 7, 1994

[54] VALVE BATTERY FOR GASEOUS FLUIDS

[75] Inventor: Wolf-Dieter Goedecke, Unterkirnach, Fed. Rep. of Germany

[73] Assignee: Mannesmann Aktiengesellschaft, Duesseldorf, Fed. Rep. of Germany

[21] Appl. No.: 865,606

[22] Filed: Apr. 9, 1992

[30] Foreign Application Priority Data

Apr. 9, 1991 [DE] Fed. Rep. of Germany ....... 4111892

[51] Int. Cl.⁵ ............ F16K 11/00

[52] U.S. Cl. ............ 137/884; 137/487.5

[58] Field of Search ............ 251/129.08; 137/487.5; 147/884

[56] References Cited

U.S. PATENT DOCUMENTS 4,078,574 3/1978 Kosarzecki .
4,724,865 2/1988 Hirano et al. ............ 137/487.5 X
4,796,651 1/1989 Ginn et al. ............ 137/487.5 X

FOREIGN PATENT DOCUMENTS 0130548 1/1985 European Pat. Off. .
0391269 10/1990 European Pat. Off. .
2178139 2/1987 United Kingdom .

*Primary Examiner*—John C. Fox
*Attorney, Agent, or Firm*—Cohen, Pontani, Lieberman, Pavane

[57] ABSTRACT

A valve battery, including a plurality of base plates, each having a generally polygonal outer contour, a window-shaped recess therein, and two side faces, a face of one plate corresponding a face of an adjacent plate and sealingly engaging one another, closure plates being provided on the free end surfaces, a plurality of electrically actuatable individual valves mounted in the base plates, each having an inlet port, an outlet port, and an electrical connection, the mounted valves not protruding from the faces of the base plates, an inlet connection associated with each of the base plates, provided on one of the elongated side surfaces thereof, an outlet connection (A1,A2) associated with each of the valves, in fluid communication with the outlet port of the associated valve on the lower side surface of the base plate, a channel provided in each of the base plates, extending generally parallel to the lower side surface, in fluid communication with the inlet connection and with the inlet port of each of the valves on the base plate, the electrical connection of the valves being brought together and extending out through a multiple pole central signal connection, at least one of the base plates (4) having an associated valve which is an on-off valve (6) which is adjacent to a base plate (1) having one or more continuous valves (14), arranged alongside each other, the outer contour (2) of the on/off-valve base plates (4) being approximately the same as the continuous-valve base plate (1), and integrated pressure sensors (18) being provided in fluid communication between the pressure-fluid outlet connection (A1,A2) of the continuous valves (14) and their outlet port.

3 Claims, 2 Drawing Sheets

VALVE BATTERY FOR GASEOUS FLUIDS

FIELD OF THE INVENTION

The present invention relates to a valve battery, particularly a pneumatic valve battery for gaseous fluids, consisting of a plurality of base plates which can be placed sealed against one another. Each of the base plates forming the valve battery has a polygonal outer contour with closure plates arranged on the corresponding end surfaces, and each base plate is provided with a plurality of electrically actuatable individual valves, which are inserted within a window-shaped recess or aperture and each valve having a diameter or size in the width direction of the base plate which is less than the thickness of the base plate. A common pressure-fluid inlet connection is provided in each case on one elongated side surface of the polygonal base plate and a pressure-fluid outlet connection associated with each individual valve is provided on a lower side surface, in which connection a channel extending from the outlet connection and extending to the end surfaces connects the inlet channels of all individual valves for the supplying of pressurized medium. The electric connections for the individual valves are enter and exit the window-shaped recess by means of a multiple pole central signal connector.

BACKGROUND OF THE INVENTION

A valve battery of the above described type is known from Federal Republic of Germany DE 39 17 242 A, corresponding to European Patent No. 0,391,269, which are expressly incorporated herein by reference. The known valve system, however, uses base plates which contain only on-off valves, those which have only two different operative configurations. Such valve batteries have a small structural size and weight, and support a high rate of flow. Further, these on-off or regulating valves assure short switching times. The installation of individually controllable directional (on-off) valves required the development of miniature solenoid valves from which unusually high flow rates are required. Such valve batteries are permitting of a simple and rapid application to existing pressure-fluid systems and to the control, for instance, of grippers, cylinders, rotary drives, handling devices, and the like.

The use of such valve batteries as on-off valves, also known as directional valves is, however, not sufficient in certain cases for the necessary direction or control processes. Thus, the known solution entirely lacks control functions.

SUMMARY AND OBJECTS OF THE INVENTION

It is an object of the present invention to improve the known valve battery so that control functions can also be carried out.

The present invention provides at least one base plate for on-off valves which is combined with at least one base plate for continuous valves, the outer contours of the two types of base plates being the same or compatible, and that one or more proportionally acting continuous valves are arranged alongside of each other in the base plate for the continuous valves and connected in each case via integrated pressure sensors to the outlet connections. The present invention thus advantageously increases the number of possible functions of such a valve battery, so that, aside from on-off valve functions of a base plate with directional valves, control functions can now also be assured, while retaining the small structural size, high flow rate and a minimum of weight with fast valve switching times. In addition, the present invention provides the particularly valuable integrated pressure sensors, which previously have been realized only in separate pressure-servo valves with integrated pressure receivers, which, for example, were operated by the directional valves. The valve battery of the present invention therefore now, in addition to the previously available functionality, permits both an exact adjustment of output pressures and a rapid change in the output pressures and can be successfully employed, for instance, as tensile-stress control for foil webs, force-controlled drives, seal testing installations, blast-air controls and many other systems known to those of ordinary skill in the art.

In accordance with further features of the invention the continuous valves or valve assemblies are provided in each case with vent lines which debouch or open into the elongated side surfaces.

It is a preferred embodiment of the present invention to provide the electric connecting lines of the pressure sensors and of the controllable electromagnets to be conducted to a multiple pole circular connector which is arranged on the upper side surface, which advantageously allows a single electrical connection for the operation of the valve.

BRIEF DESCRIPTION OF THE DRAWING

The preferred embodiments are shown by way of example in the accompanying drawings in which.

DETAILED DESCRIPTION OF THE PREFERRED EMBODIMENTS

Figure 1:
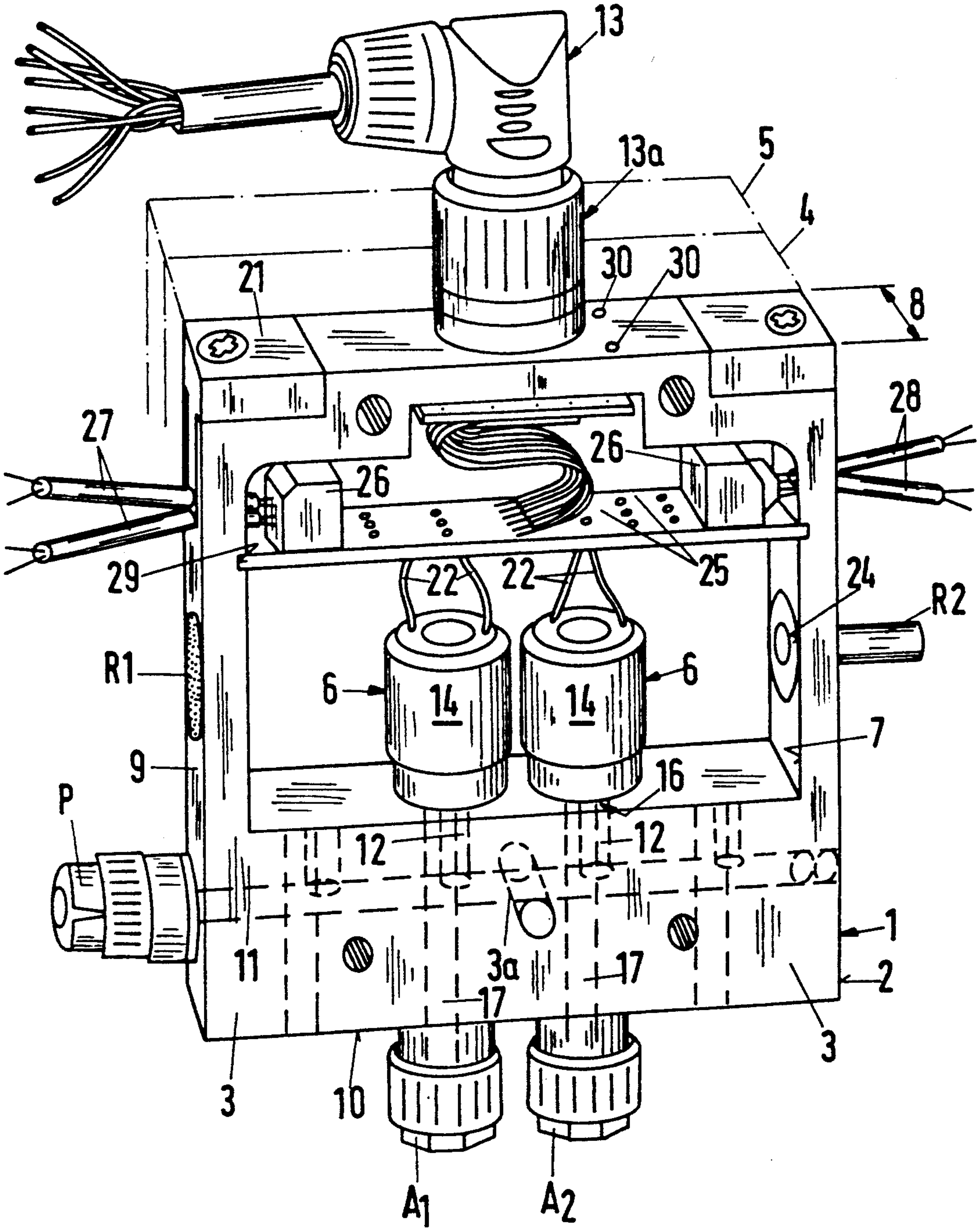
FIG. 1 is a perspective side view of a base plate with servovalves as component parts thereof.

A base plate 1 forming part of a valve battery and having a polygonal outer contour 2, i.e. in the shape of a rectangle on its outer contour, as shown in the drawing, is assembled together with an on/off-valve base plate 4, indicated as a dotted line in the figure at one or two of the end surfaces 3. The end surfaces 3, in particular the connecting channels 3*a* opening onto the end surfaces 3, are sealed off, especially at the ends of the battery. On both sides of the base plate 1 or on/off-valve base plate 4, closure plates 5 are provided, which are useful for attachment of the valve battery.

Each base plate 1 has one or more, with the present figures demonstrating two electrically actuatable individual valves 6 which can be inserted within a window-shaped recess 7 formed in the valve base plate 1. The individual valves 6 have a diameter which is less than the thickness 8 of the base plate 1, so that a plurality of base plates 1, 4 may be stacked. Of course, if the individual valve were larger than the base plate thickness, then adjacent base plates could provide the necessary clearance, but the preferred embodiment includes valves which are smaller than the base plate in the thickness direction. On the elongated side surfaces 9 are provided a pressure-fluid connection P and vent connections R1 and R2, respectively located on different sides, as shown in FIG. 1. On the lower side surface 10, are provided pressure-fluid outlet connections A1 and A2 associated with each individual valve 6. A channel 11 extending from pneumatic pressure-fluid connections and proceeding parallel to the end surfaces 3 connects the pressure supply inlet channels 12 for each of the individual valves 6. The electrical connections for the individual valves are brought together in the window-shaped recess 7 and conducted out of the base plate 1 by means of a multiple pole central signal connector 13, which may be a cable connector of known type.

A special feature of the base plate 1 is that it contains proportionally acting continuous valves 14 instead of individual on-off valves 6. In this connection, the outer contour 2 of all of the base plates 1 and 4 is the same. The window-shaped recesses 7 can have different shapes depending on the outside dimensions and the number and shape of the continuous valves 14. The continuous valves 14 are preferably arranged alongside of each other.

Figure 2:
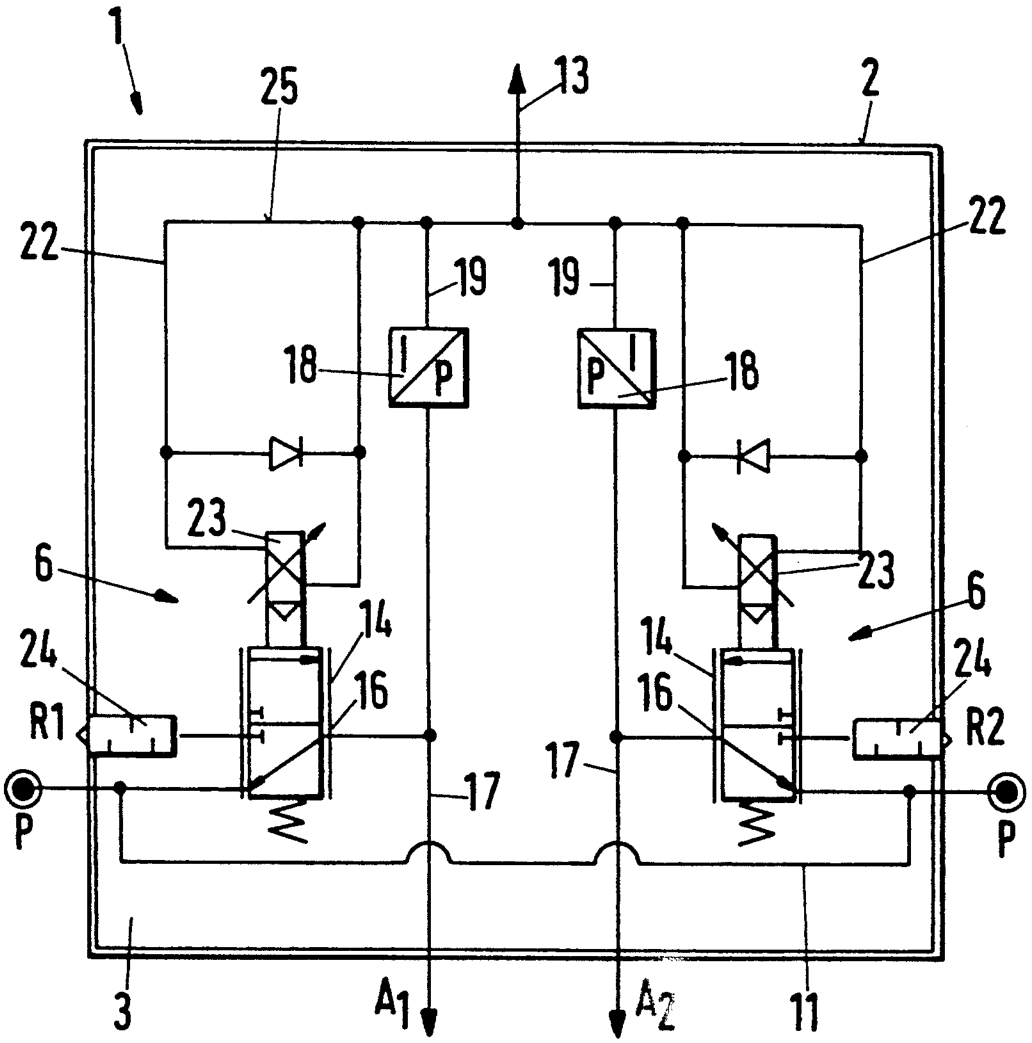
FIG. 2 is a block diagram of a side view of the end surface of a base plate according to FIG. 1, showing the pressure-fluid and electronic circuits.

As can be noted from FIG. 2, the continuous valves 14 are connected via the channel 11 to the pneumatic pressure-fluid connection P. The valve outlet 16 is switchable either to the vent connections R1, R2 debouching or venting on the elongated side surfaces 10 or to the outlet connections A1, A2. Pressure sensors 18 are connected to, and in communication with pressure lines 17 leading to the outlet connections A1, A2. The electric connecting lines 19 of these pressure sensors 17 preferably extend to the multiple pole circular connector 13*a*, which is arranged on the upper side surface 21. Electric connecting lines 22 are also conducted from controllable electromagnets 23 of the continuous valves 14 to the multiple pole circular connector 13*a*.

FIG. 1 also shows sound dampeners 24, associated with the vent connections R1, R2, a circuit board 25, connection banks 26 and connection lines 27 and 28 for the supplying of current to the electromagnets 23. The circuit board 25 is fastened in grooves 29, formed in the walls of the window-shaped recess 7. On the upper side surface 21, alongside the circular connector 13*a*, there are light-emitting diodes 30 which are associated with respective continuous valves 14, and provide visual feedback relating to the operation of the associated valve.

The on/off-valve base plate 4 can, in each case, be operated entirely separately from a continuous-valve base plate 1. In addition, pressure regulation takes place by connecting in each case one or more on/off-valve base plates 4 with continuous-valve base plates 1, by way of a pressure supply through the pressure-fluid outlet connections A1 or A2 or by way of a joint transversely extending blind hole, namely the connecting channel 3*a*. In this case, in view of the very accurately controlled pressure in a continuous-valve base plate, it is possible to turn the on-off valves of an on/off-valve base plate 4 on and off, by way of modulating the pressure from the continuous-valve base plate 1.

The present invention claims priority from German Patent Application No. P 41 11 892.8, filed Apr. 9, 1991, the entirety of which is expressly incorporated herein by reference. An English language translation of said German Patent Application No. P 41 11 892.8 is attached hereto as Appendix and forms part of this disclosure.

It should be understood that the preferred embodiments and examples described are for illustrative purposes only and are not to be construed as limiting the scope of the present invention which is properly delineated only in the appended claims.

What is claimed is:

1. A valve battery, comprising:

a plurality of base plates, each having a generally polygonal outer contour comprising a top side, a bottom side, and two elongated sides, a window-shaped recess, means for closing said window-shaped recess, a thickness, a first face and a second face, said first face of one of said plates corresponding to said second face of an adjacent base plate so as to sealingly engage when placed together, said plurality of plates having end surfaces;

a plurality of electrically actuatable valves, at least one of said valves being provided in association with each of said base plates, having an inlet port and an outlet port, and an electrical connection, said valves being shaped having an outer dimension which is smaller than said thickness of said base plates so that said valves do not protrude beyond said first and second faces of said associated base plate when mounted therein;

at least one of said base plates (4) having an associated valve which is an on-off valve (6) being adjacent to at least one of said base plates (1) having one or more associated valves which are continuous valves (14), arranged alongside each other generally parallel to said first and second faces of said base plates (1), said generally polygonal outer contour (2) of said base plates (4) having said associated valve which is an on-off valve (6) being approximately the same as said base plates (1) having said associated valves which are continuous valves (14);

a pressure-fluid inlet connection associated with each of said base plates, provided on one of said elongated side surfaces;

a channel provided in said base plates, extending generally parallel to said faces of said base plates, in fluid communication with said pressure-fluid inlet connection and with said inlet port of each of said valves associated with said base plate;

a pressure-fluid outlet connection (A1,A2) associated with each of said valves, in fluid communication with said outlet port of said associated valve, provided on said lower side surface of said base plate associated with said associated valve;

an integrated pressure sensor (18) being provided in fluid communication between said pressure-fluid outlet connection (A1,A2) associated with each of said continuous valves (14) and said outlet port of each of said associated continuous valves;

said electrical connection of each of said valves of said associated base plate being brought together in said window-shaped recess and extended out of it through a multiple pole central signal connection.

2. The valve battery according to claim 1, further comprising a vent line (R1,R2) located on an elongated side surface (10) of said base plates (1) associated with said continuous valves (14).

3. The valve battery according to claim 1, wherein said integrated pressure sensors (18) have electrical connections, and said electrical connection of each of said valves of said associated base plate and said electrical connections of said integrated pressure sensors are conducted to said multiple pole circular connector (20) provided on said upper side surface (21).

* * * * *